United States Patent Office 2,793,223
Patented May 21, 1957

2,793,223
ACRYLOXY METHYL SILOXANES

Robert L. Merker, Pittsburgh, Pa., assignor to Dow Corning Corporation, Midland, Mich., a corporation of Michigan No Drawing. Application May 20, 1954, Serial No. 431,295

11 Claims. (Cl. 260—448.2)

This invention relates to siloxanes having acryloxy groups attached to the silicon through a C–Si linkage.

Many efforts have been made in the past to modify polysiloxanes so that solventless thermosetting silicone resins could be produced. One of the difficulties with siloxane resins has been the fact that it required high temperatures and relatively long heating schedules to satisfactorily cure them. This was also true of siloxane rubbers.

The primary object of this invention is to provide modified siloxanes which can be set at low temperature and a short period of time. Another object is to prepare siloxanes which can be employed for dipping varnishes, impregnating solventless resins and in the fabrication of elastomers. Other objects and advantages will be apparent from the following description.

This invention relates to siloxanes of the formula $$[CH_2=CRCOOCH_2]R'_nSiO_{\frac{3-n}{2}}$$

in which R is selected from the group consisting of hydrogen atoms and methyl radicals, R' is a monovalent hydrocarbon radical and $n$ has a value from 1 to 2 inclusive.

The siloxanes of this invention may be prepared in a number of ways. The best method is that of reacting a metal salt (preferably an alkali metal salt) of acrylic acid or methacrylic acid with a halomethylsiloxane. An alternative method is that of reacting sodium or potassium acetate with the chloromethylsiloxanes and thereafter heating the resulting acetoxymethylsiloxane with acrylic or methacrylic acid at a temperature above the boiling point of acetic acid. Under these conditions an exchange will take place wherein the acryloxy group will be substituted on the methyl radical and acetic acid will distill off. When this method is employed a polymerization inhibitor such as hydroquinone should be employed and it is best to carry out the reaction in an oxygen free atmosphere.

For the purpose of this invention the R' group substituted on the silicon atom can be any monovalent hydrocarbon radical. Specific examples of such radicals are alkyl radicals such as methyl, ethyl and octadecyl; alkenyl radicals such as vinyl, allyl and hexenyl; cycloaliphatic radicals such as cyclohexyl, cyclohexenyl and cyclopentyl; aromatic hydrocarbon radicals such as phenyl, naphthyl, xenyl and tolyl and aralkyl hydrocarbon radicals such as benzyl. These siloxanes may contain 1 or 2 monovalent hydrocarbon radicals attached to the silicon and the hydrocarbon radicals attached to the individual silicon atoms may be the same or different.

The halomethylsiloxanes which are employed as intermediates in this invention may be prepared by halogenating the corresponding methyl siloxanes or they may be prepared by halogenating the corresponding methylhalosilanes and thereafter hydrolyzing the siloxane. An alternative method is that of halogenating a methyltrihalosilane and thereafter reacting it with a Grignard reagent containing the desired monovalent hydrocarbon radical. In the latter case a preferential reaction will occur between the Grignard reagent and the silicon-bonded halogen.

The acryloxy substituted siloxanes of this invention may be copolymerized with siloxanes of the unit formula

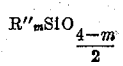

in which R'' is a monovalent hydrocarbon radical, an acetoxymethyl radical or a halogenated monovalent hydrocarbon radical and $m$ has an average value from 1 to 3 inclusive. The copolymerization may be carried out by means of well known acid catalyzed siloxane copolymerization methods. Such copolymers may contain from .001 to 99.999 mol percent of the siloxanes of this invention, the remainder of the copolymer being the aforesaid acetoxymethyl, hydrocarbon and halogenated hydrocarbon substituted siloxanes. These copolymers are useful in the preparation of siloxane resins and elastomers.

The following examples are illustrative only and should not be construed as limiting the invention which is properly set forth in the appended claims. For simplicity the symbol "Me" has been used herein to represent the methyl radical.

Example 1

A mixture of 50.5 g. of potassium methacrylate, 46.5 g. of bis-chloromethyltetramethyldisiloxane, 75 g. of methacrylic acid and 75 g. of dimethylformamide was refluxed for 1 hour. The product was filtered and the solvent removed. Upon distillation a fluid material having the formula

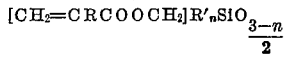

was obtained. This fluid had the following properties: B. P. 127° C. at 3 mm., $n_D^{25}$ 1.4472, $d_4^{25}$ .996 MR found 88.52, theory 88.46.

Example 2

One mol of the product of Example 1 was copolymerized with 3 mols of hexamethyldisiloxane by mixing the two with 2 g. of concentrated sulfuric acid and 5 g. of trifluoroacetic acid. The mixture was allowed to stand for 12 hours and was then washed with sodium bicarbonate until neutral. The product was dried and distilled to give the compound

which had the following properties: B. P. 86.5° C. at 10 mm., $n_D^{25}$ 1.4202, $d_4^{25}$ .903, MR found 68.9, theory 68.7, bromine No. found 64.6, theory 64.7. .01 percent by weight benzoyl peroxide was added to this product and the mixture heated at 70° C. under nitrogen for two hours. The resulting polymer was a tough, plastic material suitable for use as a molding composition.

Example 3

A mixture of 48 g. of bis-acetoxymethyltetramethyldisiloxane, 50 g. of hexamethyldisiloxane, 43 g. of acrylic acid, 2 g. of concentrated sulfuric acid and 5 g. of hydroquinone was refluxed under nitrogen for 8 hours. The product was then washed free of acid and distilled to give the compound

This compound had the following properties: B. P. 88.7° C. at 10 mm., $n_D^{25}$ 1.4165, $d_4^{25}$ .906, MR found 64.2, calculated 64.1. There was also obtained the compound

This compound had the following properties: B. P. 137.8° C. at 10 mm., $n_D^{25}$ 1.4337, $d_4^{25}$ 1.01, MR found 75, calculated 75.1. The distillation residue was the compound

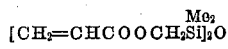

which had $n_D^{25}$ of 1.4480.

Example 4

One mol of methacryloxymethylpentamethyldisiloxane and 2 mols of octamethylcyclotetrasiloxane were mixed with 5 percent by weight concentrated sulfuric acid and allowed to stand at room temperature 12 hours. The product was washed free of acid and there was obtained a liquid material which had the average general formula

This fluid polymerized to a resilient material when heated with .1 percent by weight benzoyl peroxide at 70° C. in a nitrogen atmosphere.

Example 5

10 g. of bis-methacryloxymethyltetramethyldisiloxane and 10 g. of phenylmethylpolysiloxane were copolymerized with 2 g. of concentrated sulfuric acid in the manner of Example 4. The resulting copolymer had the average general formula

This copolymer was polymerized to a hard tough resin when heated at 120° C. under nitrogen with .1 percent by weight azo-iso-butyronitrile.

Example 6

When 1 mol chloromethylheptamethylcyclotetrasiloxane is reacted with 1 mol of sodium acrylate in 100 cc. dimethylformamide at the reflux temperature of the solvent, the compound

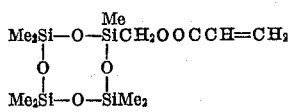

is obtained.

When 1 mol of this cyclic siloxane is copolymerized with .5 mol of vinylmethylsiloxane and .5 mol chlorophenylmethylsiloxane in the manner of Example 4 a copolymer containing 25 mol percent vinylmethylsiloxane, 25 mol percent chlorophenylmethylsiloxane, 37.5 mol percent dimethylsiloxane and 12.5 mol percent acryloxymethylmethylsiloxane is obtained.

That which is claimed is:

1. A siloxane of the unit formula

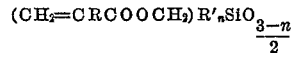

in which R is selected from the group consisting of hydrogen and methyl radicals, R' is a monovalent hydrocarbon radical and $n$ has a value from 1 to 2 inclusive.

2. A siloxane in accordance with claim 1 wherein R' is a methyl radical.

3. A copolymeric siloxane in which from .001 to 99.999 mol percent of the polymer units are of the formula

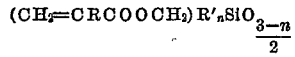

in which R is selected from the group consisting of hydrogen and methyl radicals, R' is a monovalent hydrocarbon radical and $n$ has a value from 1 to 2 inclusive and the remainder of the polymer units are of the formula

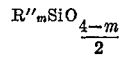

in which R" is selected from the group consisting of acetoxymethyl radicals, monovalent hydrocarbon radicals and halogenated monovalent hydrocarbon radicals and $m$ has an average value from 1 to 3 inclusive.

4. A siloxane in accordance with claim 3 in which R' and R" are methyl radicals.

5.

6.

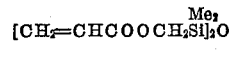

7.

8.

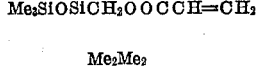

9.

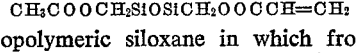

10. A copolymeric siloxane in which from .001 to 99.999 mol percent of the polymer units are of the formula

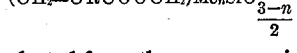

in which R is selected from the group consisting of hydrogen and methyl radicals and $n$ has a value from 1 to 2 inclusive and the remainder of the polymer units are phenyl and methyl siloxane units.

11.

in which $x$ has a value of at least one.

References Cited in the file of this patent
FOREIGN PATENTS 635,733    Great Britain _____ Apr. 12, 1950